United States Patent Office 3,421,165
Patented Jan. 14, 1969

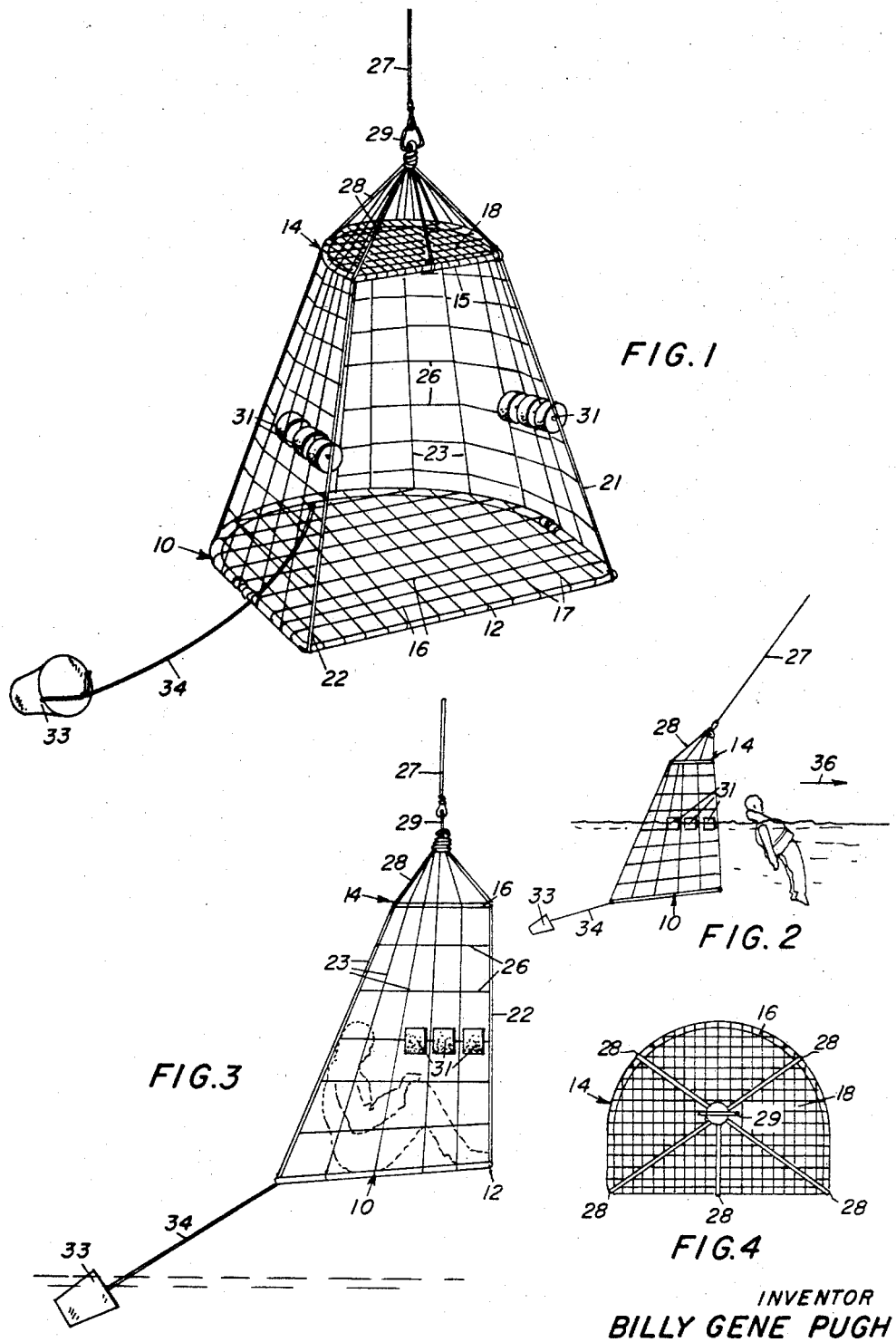

3,421,165
PERSONNEL RECOVERY NET
Billy Gene Pugh, P.O. Box 802,
Corpus Christi, Tex. 78403
Filed Aug. 3, 1967, Ser. No. 658,187
U.S. Cl. 9—14                                    3 Claims
Int. Cl. B63c 9/00

ABSTRACT OF THE DISCLOSURE

A net structure for use with a lifting cable such as carried by a helicopter for recovering an individual from the water and the net assembly is constructed to act as a scoop to substantially encase an injured person or an inantimate object floating on the surface of the water.

---

The present invention pertains to a personnel recovery net adapted to be attached to a lift cable and the invention more specifically relates to a net assembly which has particular utility for use in recovering injured or unconscious individuals from the water.

Summary of the invention

A net assembly embodying the invention includes a base spreader ring and an upper spreader ring with flexible non-elastic lacings connecting the spreader rings forming an enclosing net structure provided with an opening at the forward portion through which an individual or an inantimate object may enter the net in a scooping operation. The rear portion of the base spreader ring is disposed at a lower elevation than the forward portion to provide a pocket in the net structure into which a person may nestle while the net assembly is raised by a lifting cable.

Other objects and features of the invention will be appreciated and become apparent as the present disclosure proceeds and upon consideration of the following detailed description taken in conjunction with the accompanying drawing wherein the embodiment of the invention is disclosed.

In the drawing:

FIG. 1 is a perspective view of a personnel recovery net embodying the invention.

FIG. 2 is a side elevational view of the net assembly on a smaller scale depicting the manner in which an injured individual may be recovered from the water.

FIG. 3 is a side elevational view illustrating the manner in which an individual nestles in the pocket at the rear of the net assembly.

FIG. 4 is a plan view of the net structure.

The net assembly exhibiting the invention includes a base ring 10 which is of a circular shape throughout a rear portion and is provided with a straight forward portion 12. An upper spreader ring 14 forms a part of the net structure and has a shape similar to the base spreader ring but spans a smaller area. A straight portion 15 of the upper spreader ring forms the forward edge of the upper spreader. These spreader rings may be covered with suitable cushioning material (not shown).

The area spanned by the base spreader ring 10 is closed by suitable means such as lacings 16 and 17 disposed substantially at right angles to each other and secured to the respective portions of the base spreader ring. The means closing the area embraced by the base spreader ring desirably has openings therethrough to permit the water to escape from within the net. Any suitable netting 18 may be provided for spanning the area defined by the upper spreader ring 14. The lacings 16 and 17 and the netting 18 are attached to the respective spreader rings and maintained in generally taut conditions.

A longitudinally extending flexible non-elastic element 21 connects one end of the straight portion 12 of the base spreader ring to the associated end of the straight portion 16 of the upper spreader ring. Another longitudinally extending flexible non-elastic element 22 connects the other end of the straight portion 12 of the base spreader ring to the associated end of the straight portion 15 of the upper spreader ring. The area between the flexible elements 21 and 22 is devoid of netting and is open and unobstructed. A plurality of longitudinally extending flexible non-elastic members 23 connect other portions of the base spreader ring 10 to corresponding portions of the upper spreader ring 14. These members 23 are circumferentially spaced from each other. The flexible non-elastic members 23 are progressively of greater length in proceeding rearwardly from the straight portions of the spreader rings. Such structure insures that the base spreader ring 10 and the lacings 16 and 17 carried thereon slopes downwardly in proceeding rearwardly from the straight portion 12 of the base spreader ring to provide a pocket within the rear portion of the net when the upper spreader ring 14 is disposed in a substantially horizontal plane as shown in FIG. 3. The net structure includes circumferentially extending cords 26 which are connected to the longitudinally extending members 23 and the longitudinally extending elements 21 and 22 at spaced points along these members and elements. The circumferentially extending cords 26 are omitted at the front portion of the net as best shown in FIG. 1 to provide a doorway.

Any suitable means may be provided for connecting the upper spreader ring 14 to a lifting cable 27. Such means may take the form of ropes 28 connected to the ring 14 and converge toward each other in proceeding upwardly. An eyelet 29 may be attached to the ropes 28 to provide convenient structure for attaching the lifting cable 27.

The assembly includes buoyant elements 31 attached to an intermediate portion of the net structure. The buoyant elements may be formed of any suitable material and are attached to the net so that it floats with only the lower portion submerged and in a position approximating that illustrated in FIG. 2. A sea anchor 33 is attached by a cord 34 to the rear portion of the base spreader ring 10. The anchor 33 serves to orient the assembly to dispose the open doorway forwardly as the net is moved in the direction of the arrow 36. The anchor may be constructed to have the shape of a bucket and formed principally of textile material.

In carrying out a recovery of an injured pilot from the water the assembly is lowered by the cable 27 carried by a helicopter. The net structure settles in the water until the buoyant elements 31 displace sufficient water to support the assembly with the base spreader ring 10 below the surface and in a position somewhat represented in FIG. 2. As the helicopter moves in the direction of the arrow 36 the sea anchor 33 serves to orient the net so that the open doorway is in a position registering with an individual partially submerged in the water. As the net structure is moved in the direction of the arrow 36 the individual enters the net through the open doorway. The anchor 33 and the rope 34 tend to maintain the longitudinally extending members 23 at the rear portion of the net taut so that the base spreader ring 10 and the webbing carried thereon slopes downwardly to facilitate movement of the individual into the rear pocket portion of the net. During lifting of the assembly the individual nestles in the rear portion of the net as shown in FIG. 3.

While the invention has been described with reference to specific structural details, it will be appreciated that changes may be made in the components as well as the

What is claimed and desired to be secured by Letters Patent is:

1. A personnel recovery net comprising, a base spreader ring having a substantially straight forward portion, an upper spreader ring similar in shape to the base spreader ring, taut lacing means closing the area between the perimeter of the base spreader ring, a longitudinally extending flexible non-elastic element connecting each end of the straight portion of the base spreader ring to an associated end of the straight portion of the upper spreader ring, longitudinally extending flexible non-elastic members connecting other portions of the perimeter of the base spreader ring rearwardly of said straight portion to corresponding portions of the upper spreader ring, means carried by the upper spreader ring for attaching a cable thereto supporting the upper spreader ring in a substantially horizontal plane, said flexible non-elastic members throughout the perimeters of said spreader rings being progressively of greater length in proceeding rearwardly from said straight portions whereby the base spreader ring and the lacing means carried thereon slopes downwardly in proceeding rearwardly from the straight portion of the base spreader ring when the upper spreader ring is in a substantially horizontal plane, circumferentially extending cords connected to said longitudinally extending elements and connected to said longitudinally extending members at spaced points therealong providing a flexible net enclosing the area between the base and upper spreader rings rearwardly of said straight portions and being open at the front between said flexible non-elastic elements.

2. A personnel recovery net according to claim 1 including buoyant means carried by the forward portion of the net intermediate the base and upper spreader rings.

3. A personnel recovery net according to claim 1 including a sea anchor attached to the rear portion of the base spreader ring.

References Cited

UNITED STATES PATENTS

| | | | |
|---|---|---|---|
| 2,817,860 | 12/1957 | Fritz | 9—14 |
| 3,036,315 | 5/1962 | Karnow | 9—14 |
| 3,176,327 | 4/1965 | Oberth | 9—14 |
| 3,228,044 | 1/1966 | Mattenson | 9—14 |

REINALDO P. MACHADO, *Primary Examiner.*

U.S. Cl. X.R.

182—150